United States Patent [19]

Murray

[11] Patent Number: 4,614,357
[45] Date of Patent: Sep. 30, 1986

[54] TRUCK-TRAILER ANTITHEFT LOCKING SYSTEM

[76] Inventor: John M. Murray, 8633 Delmonico Ave., Canoga Park, Calif. 91304

[21] Appl. No.: 626,771

[22] Filed: Jul. 2, 1984

[51] Int. Cl.⁴ .............................................. B60D 1/10
[52] U.S. Cl. .................................... 280/507; 280/428
[58] Field of Search .................... 280/423 R, 427, 428, 280/431, 432, 436, 437, 507

[56] References Cited

U.S. PATENT DOCUMENTS 4,325,237  4/1982  Menzie ................................ 280/507

Primary Examiner—Henry Bennett
Attorney, Agent, or Firm—Allan M. Shapiro

[57] ABSTRACT

When the air brake line on a semi-trailer is disconnected, a plunger is thrust down through the semi-trailer bottom plate to obstruct access to the semi-trailer hitch pin. Reconnection of the air brake line withdraws the plunger.

19 Claims, 8 Drawing Figures

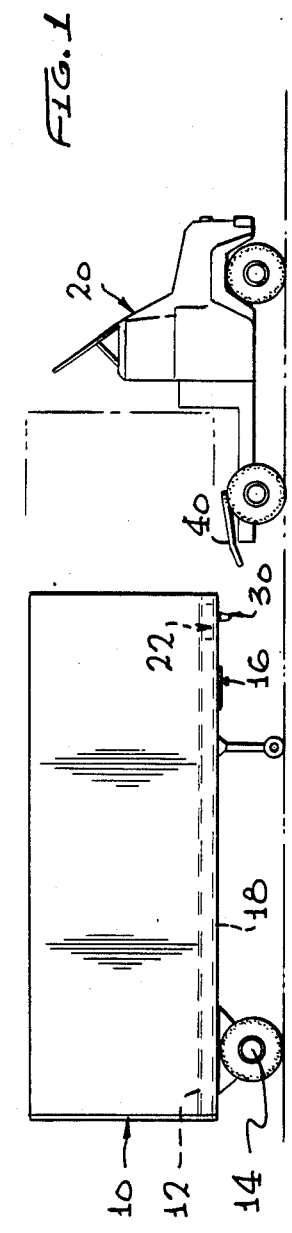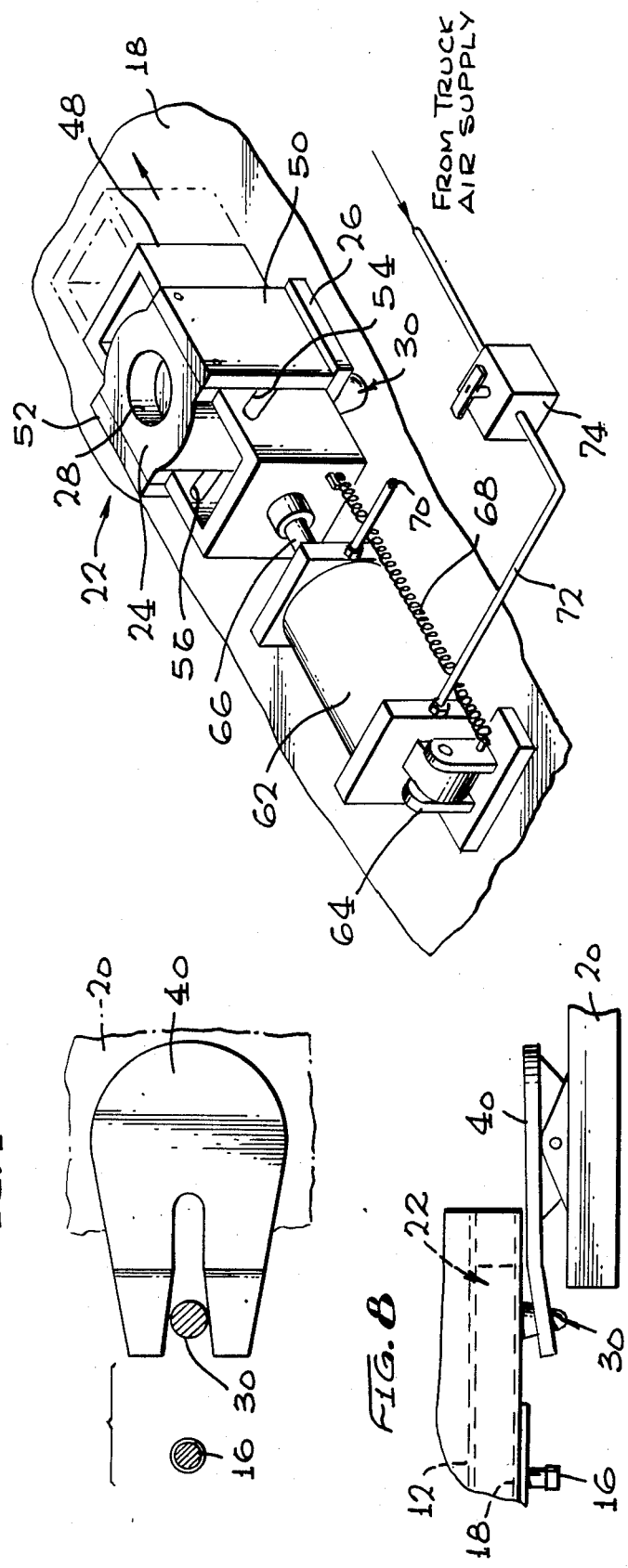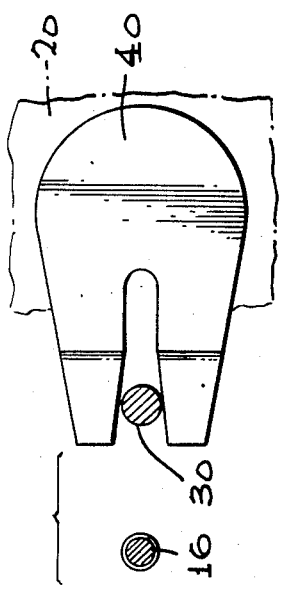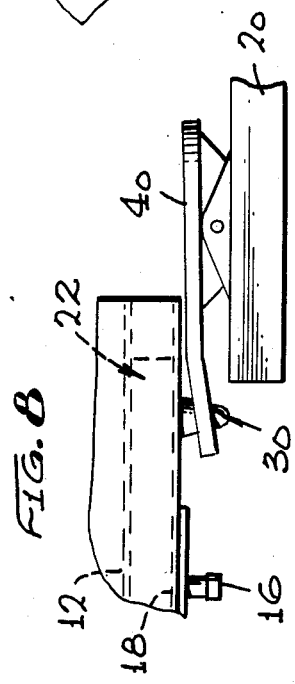

U.S. Patent   Sep. 30, 1986   Sheet 2 of 2   4,614,357
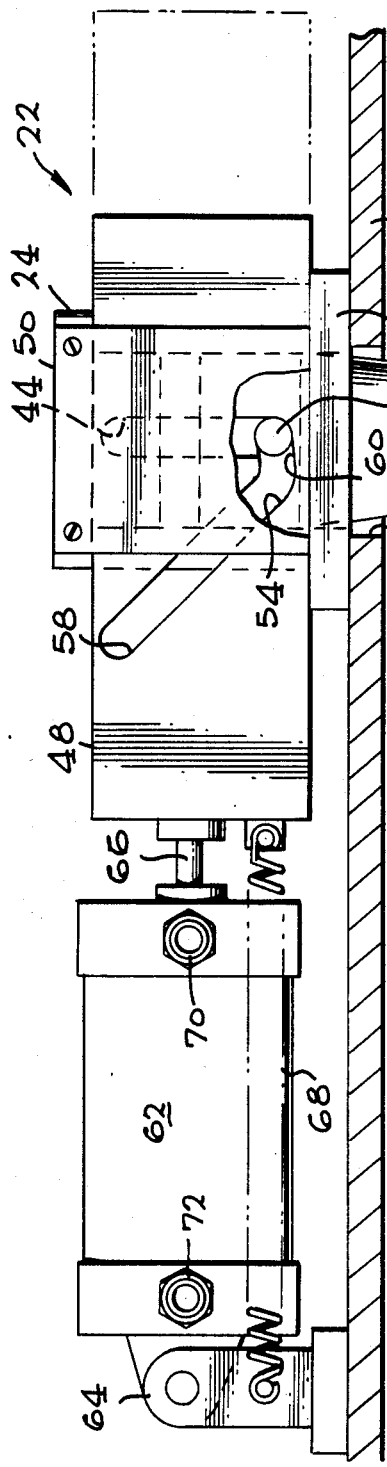
FIG. 3
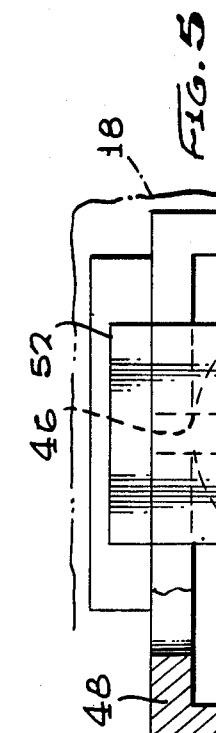
FIG. 5
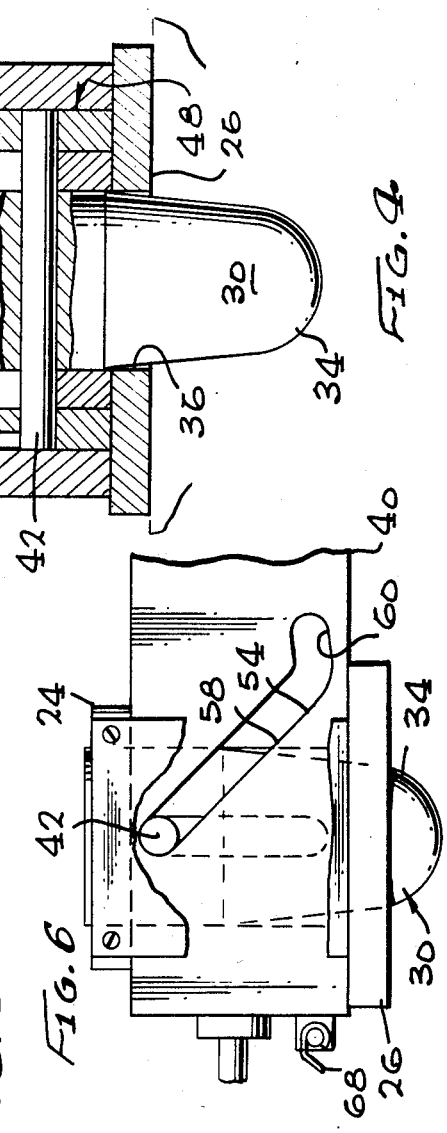
FIG. 4
FIG. 6

TRUCK-TRAILER ANTITHEFT LOCKING SYSTEM

BACKGROUND OF THE INVENTION

This invention is directed to a system whereby a semi-trailer is inhibited against theft by thrusting a plunger in the way of access to the semi-trailer hitch.

Semi-trailers are widely used in modern transportation of goods. These semi-trailers are provided with a hitch pin which selectively engages in and is releasably locked in the fifth wheel of a truck or tractor. When a semi-trailer loaded with cargo is parked, it is susceptible to theft by the simple engagement by a new truck. One useful way of preventing unauthorized removal of a semi-trailer is by the maintaining of the brakes in the locked condition by closing and locking a valve which prevents release of air from the brake line. Such a system is disclosed in patent application Ser. No. 530,530, entitled "Truck Trailer Brake Air Line Lock," filed Sept. 9, 1983 by John M. Murray, the entire disclosure of which is incorporated herein by this reference. Such a system greatly enhances the antitheft characteristics of a semi-trailer, but does not inhibit the hitching up of a truck to the hitch pin of a semi-trailer. Thus, it is desirable to further improve the security of semi-trailers.

SUMMARY OF THE INVENTION

In order to aid in the understanding of this invention, it can be stated in essentially summary form that it is directed to a truck-trailer antitheft locking system wherein a plunger is positioned so that it can be moved to obstruct access to the semi-trailer hitch pin, with the plunger actuated by air which can be supplied only by the proper user.

It is, thus, an object and advantage of this invention to provide a truck-trailer antitheft locking system wherein only an authorized hauler of the trailer can hitch thereto to inhibit theft of the trailer.

It is a further object and advantage of this invention to provide a locking system for a semi-trailer wherein a plunger is extended adjacent the trailer hitch pin to prevent access to the hitch pin by unauthorized haulers.

It is a further object and advantage of this invention to permit access to the hitch pin of a semi-trailer by the control of air to the access mechanism, with the air control being lockable so that only an authorized user can control the pressure in the compressed air line to the access mechanism.

The features of the present invention which are believed to be novel are set forth with particularity in the appended claims. The present invention, both as to its organization and manner of operation, together with further objects and advantages thereof, may be best understood by reference to the following description, taken in conjunction with the accompanying drawings.

BRIEF DESCRIPTION OF THE DRAWINGS

FIG. 1 is a side-elevational view of a semi-trailer together with a truck or tractor for hauling the semi-trailer.

FIG. 2 is an isometric view of the access control mechanism for controlling access of the truck to the hitch on the semi-trailer.

FIG. 3 is a side-elevational view of the access control mechanism, with parts broken away and with the bottom panel of the semi-trailer taken in section.

FIG. 4 is a section taken generally along the line 4—4 of FIG. 3.

FIG. 5 is a plan view of the access mechanism, with parts broken away and parts taken in section.

FIG. 6 is a view similar to FIG. 3, with parts broken away, showing the mechanism in the plunger-withdrawn position.

FIG. 7 is a plan view of the fifth wheel on the truck, shown in relationship to the plunger and hitch pin of the semi-trailer.

FIG. 8 is a side-elevational view of the relationship shown in FIG. 7.

DESCRIPTION OF THE PREFERRED EMBODIMENT

Semi-trailer 10 is shown in FIG. 1. It is the purpose of this invention to inhibit the unauthorized removal of such a semi-trailer. Semi-trailer 10 has a floor 12 upon which goods are carried, and under the floor are structural members to provide support for the floor and give strength to the semi-trailer. Rear axle 14 and hitch pin 16 are mounted on those structural members. Bottom plate 18 is provided under the structural members to close the bottom.

Semi-trailer 10 can be hitched up to and towed away by means of truck 20. Since the truck is primarily equipped for supporting the front end of a semi-trailer and towing the semi-trailer, it is sometimes called a tractor. Truck 20 is provided with an air braking system which supplies air through disconnectable hoses to the air brake system on the semi-trailer. Usually, a dual air system is provided so that if there is failure in one system, the other has a chance of working. The semi-trailer brakes are designed so that when air is supplied to the brakes, the brakes are engaged. The air lines from the truck to the semi-trailer are preferably connected to the truck through a "Truck-Trailer Brake Air Line Lock," as described in patent application Ser. No. 530,530, filed Sept. 9, 1983.

A separate manner of enhancing the antitheft security of the semi-trailer 10 is through the antitheft locking system in accordance with this invention. The principal part of the locking system comprises access control mechanism 22 shown in FIGS. 2 and 3 and portions of which are shown in FIGS. 4, 5 and 6. In the access control mechanism, body 24 is secured to baseplate 26 which is, in turn, secured to the bottom plate 18 or other strong structural member in the semi-trailer. Bore 28 is in the form of a right circular cylinder and extends upright through body 24 and baseplate 26. Plunger 30 has an upper, cylindrical section 32 which slides in the bore and a lower partly conical, partly spherical nose 34 which projects downward through opening 36 in baseplate 26 and downward through opening 38 in the bottom plate 18. When the plunger is in the lowered position shown in FIGS. 1, 3, 4 and 8, the nose of the plunger extends downward below bottom plate 18. The access control mechanism 22 is positioned with respect to hitch pin 16 so that when the plunger is in its down position, it obstructs access to the hitch pin 16. FIGS. 7 and 8 show fifth wheel 40 on truck 20. In these figures, the plunger 30 is shown to be wider than the slot in the fifth wheel 40 which normally receives hitch pin 16. When the plunger is positioned in the lowered position illustrated in FIGS. 1, 3, 4, 7 and 8, the truck cannot reach and engage the hitch pin. Since it cannot engage the hitch pin, the truck cannot tow away the semi-trailer. Thus, the security of the semi-trailer is enhanced for those who do not have the equipment to raise plunger 30.

Crosspin 42 extends through the cylindrical section 32 of plunger 30 and slides in upright slots 44 and 46 in body 24. This limits the distance of motion of the plunger and prevents rotation of the plunger. Open-centered rectangular box 48 embraces the body 24. It is held in alignment with the body by means of side plates 50 and 52. Crosspin 42 extends into cam slots 54 and 56 and nearly to the side plates. The cam slots are shaped so that when the box is moved to the right, as shown in FIG. 6, the plunger 30 is raised; and when the box is moved to the left, as shown in FIG. 3, the plunger is extended downwardly. Over most of its length, the cam slots are straight and angled downward to the right, as seen in FIG. 3, over a straight portion 58. This causes proportional downward motion of the plunger as the control box 48 moves to the left. At the right end of the cam slots 54 and 56, there is a lock portion 60. The lock portion is a short portion at the right end of the straight portion and angles slightly upward. When pin 42 is in the lock portion 60, upright thrust on plunger 30 will not urge control box 48 to the right, but instead, will hold the crosspin 42 in the right end of cam slots 54 and 56.

Air cylinder 62 is mounted on bottom plate 18 by means of clevis 64. Air cylinder 62 has a piston therein, and piston rod 66 is secured to the piston. The piston and piston rod are slidable with respect to the cylinder and are driven with respect to the cylinder by the introduction and exhaust of air from the cylinder. Piston rod 66 is secured to control box 48. Tension spring 68 is also connected between control box 48 and clevis mount 64. Port 70 on the rod end of air cylinder 62 is always vented. Port 72 on the head end of air cylinder 62 is selectively connected to a source of air under pressure. When port 72 is vented, spring 68 draws the control box 48 to the left, to the position shown in FIG. 3. In this position, the plunger is extended and access to hitch pin 16 is inhibited. When compressed air of sufficient pressure is supplied to port 72, the piston, piston rod and control box are thrust to the right, the position in FIG. 6. The pressure must be sufficient to overcome the force of spring 68 and overcome the friction and weight of the parts. When in the right position shown in FIG. 6, access to the hitch pin is permitted.

Control of air to port 72 is accomplished by a separate supply of air from the air tank on truck 20 through a disconnect fitting and through a lockable valve 74 to port 72. The lockable valve may be a single valve of the type described in the prior application for "Truck-Trailer Brake Air Line Lock," identified above. On the other hand, it may be a third lockable valve in the same locking system as described in that application.

In the absence of air pressure supplied to air cylinder 62, the control box is in the left position of FIG. 3 so that access to the hitch pin is inhibited. When an authorized user desires to connect up to and haul the trailer 10, he brings his truck into proximity, connects up the brake air lines and the separate air line to cylinder 62. He unlocks the lockable valve 74 and turns the valve open. This permits flow of air to the left side of the piston in air cylinder 62 thrusting control box 48 to the right, thereby raising plunger 30. Now the truck can back toward the hitch pin 16 and receive the hitch pin in the open slot in the back of fifth wheel 40. When the truck is fully backed into position, hitch pin 16 is locked into the fifth wheel. The driver raises the parking wheels on the semi-trailer, checks his brakes, and drives away. Without the access control mechanism 22, any truck with a fifth wheel could haul away the trailer. By the use of the truck-trailer antitheft locking system of this invention, the truck need not only to supply air, but must also unlock valve 74 so that the air can raise the plunger. In this way, semi-trailer security is considerably enhanced.

It will be appreciated that the access control mechanism must be strongly mounted. When the semi-trailer does not have an overall bottom plate 18, the access control mechanism can be mounted with respect to the structural members beneath floor 12. Furthermore, a protective bottom plate may be placed only under the general area of the access control mechanism in order to inhibit destructive access thereto and to protect the mechanism against weather and road contamination.

This invention has been described in its presently contemplated best mode, and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. An antitheft locking system for a semi-trailer comprising:
a plunger for positioning with respect to the hitch pin on a semi-trailer, said plunger being movable from a retracted position to an extended position so that in the extended position it inhibits access to the hitch pin on the semi-trailer and in its retracted position, permits access to the hitch pin; and
means for controllably extending said plunger.

2. The antitheft locking system of claim 1 wherein said means includes a spring for extending said plunger.

3. The antitheft locking system of claim 2 wherein said means includes a cam slot having a lock portion so that, when said spring extends said plunger, said lock portion of said cam slot prevents thrust on said plunger from moving said plunger into the retracted position.

4. The antitheft locking system of claim 1 wherein said means includes a pin on said plunger and a cam slot in a control box and also includes an air cylinder connected to said control box so that application of air under pressure to said air cylinder can move said control box to cause said cam slot to retract said plunger.

5. The antitheft locking system of claim 4 wherein there is a locking air valve connected to said air cylinder so that air cannot be supplied to said cylinder to withdraw said plunger until said locking air valve is unlocked and opened.

6. The antitheft locking system of claim 5 wherein a spring is connected to said control box to urge said control box to extend said plunger to its extended position, in the absence of air under pressure to said cylinder.

7. The antitheft locking system of claim 6 wherein said cam slot in said control box includes a portion for withdrawing said plunger and a portion for locking said plunger in its extended position.

8. An antitheft locking system for a semi-trailer having a hitch pin, comprising:
an access control mechanism for mounting on the semi-trailer, a plunger movably mounted in said access control mechanism for movement from an extended position where it inhibits access to the hitch pin to a retracted position which permits access to the hitch pin, said access control mechanism including a body for securing on the semi-trailer, said plunger being movably mounted with respect to said body, a pin on said plunger, a control box having a cam slot therein, said pin extending into said cam slot; and means for moving said control box to control extension of said plunger.

9. The antitheft locking system of claim 8 wherein said means for moving said control box comprises an air cylinder connected to said control box so that when air is supplied to said air cylinder, said plunger is retracted.

10. The antitheft locking system of claim 9 wherein a lockable air valve is connected to said air cylinder so that air under pressure can be supplied to said air cylinder only when said lockable air valve is unlocked and turned open.

11. The antitheft locking system of claim 10 wherein a spring is connected to said control box to urge said control box to a plunger-extended position when air under pressure is not supplied to said air cylinder.

12. The antitheft locking system of claim 8 wherein said means for moving said control box includes a spring connected to said control box to urge said control box to a plunger-extended position.

13. The antitheft locking system of claim 8 wherein said cam slot includes a portion for extending said plunger and a locking portion for locking said plunger in the extended position in the absence of movement of said control box.

14. The antitheft locking system of claim 11 wherein said cam slot includes a portion for extending said plunger and a locking portion for locking said plunger in the extended position in the absence of movement of said control box.

15. An antitheft locking system comprising:

an access control mechanism, said access control mechanism having a body therein, a bore in said body, a plunger movably mounted in said bore for movement from a retracted position to an extended position, means for mounting said access control mechanism on a semitrailer adjacent the hitch pin of the semi-trailer so that when said plunger is extended it inhibits access to the hitch pin of the semi-trailer; and means for moving said plunger.

16. An antitheft locking system comprising:

an access control mechanism, said access control mechanism having a body therein, a bore in said body, a plunger movably mounted in said bore for movement from a retracted position to an extended position, said access control mechanism being for mounting in a semi-trailer so that when said plunger is extended it inhibits access to the hitch pin of the semi-trailer; and means for moving said plunger including a slot in said body aligned with the direction of movement of said plunger and a pin mounted in said plunger and extending through said slot, said means further including a control box embracing said body, said control box having a cam slot therein, said pin being engaged in said cam slot, said control box being movable in a direction transverse to the movement of said plunger for moving said plunger.

17. The antitheft locking system of claim 16 wherein a spring is connected to said control box to urge said control box in a direction to extend said plunger.

18. The antitheft locking system of claim 17 wherein an air cylinder is connected to said control box so that actuation of said air cylinder causes retraction of said plunger.

19. The antitheft locking system of claim 18 wherein a lockable air valve is connected to said air cylinder to prevent actuation of said air cylinder and withdrawal of said plunger without unlocking and opening of said lockable air valve.

* * * * *